(12) United States Patent
Cho et al.

(10) Patent No.: US 8,040,442 B2
(45) Date of Patent: Oct. 18, 2011

(54) LIGHT GUIDE PLATE AND LIQUID CRYSTAL DISPLAY HAVING THE SAME

(75) Inventors: Jong-Whan Cho, Seoul (KR); Kee-Han Uh, Yongin-si (KR); Sang-Woo Park, Seoul (KR); Sang-Jin Pak, Yongin-si (KR); Jae-Ik Lim, Chuncheon-si (KR); Bang-Sil Choi, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 691 days.

(21) Appl. No.: 12/145,175

(22) Filed: Jun. 24, 2008

(65) Prior Publication Data
US 2008/0246904 A1    Oct. 9, 2008

Related U.S. Application Data

(63) Continuation of application No. 10/525,060, filed as application No. PCT/KR03/001084 on Jun. 3, 2003, now Pat. No. 7,405,774.

(30) Foreign Application Priority Data

| Aug. 20, 2002 | (KR) | ............................... 2002-0049272 |
| Aug. 20, 2002 | (KR) | ............................... 2002-0049273 |
| Nov. 5, 2002  | (KR) | ............................... 2002-0068250 |

(51) Int. Cl.
G02F 1/1335    (2006.01)

(52) U.S. Cl. ......................................................... 349/12

(58) Field of Classification Search ...................... 349/12
See application file for complete search history.

(56) References Cited

U.S. PATENT DOCUMENTS
5,852,487 A    12/1998  Fujimori et al.

FOREIGN PATENT DOCUMENTS

| EP | 1020755 | 7/2000 |
| KR | 1020010033970 | 4/2001 |
| KR | 1020010090961 | 10/2001 |
| TW | 446976 | 7/2001 |
| WO | WO0070550 | 11/2000 |

*Primary Examiner* — James Dudek
(74) *Attorney, Agent, or Firm* — F. Chau & Associates, LCC

(57) ABSTRACT

A liquid crystal display apparatus comprising a liquid crystal display panel and a touch panel is disclosed. A first transparent electrode is disposed on an upper surface of the liquid crystal display panel for displaying an image. A second transparent electrode is disposed on a lower surface of a retardation member and the second transparent electrode is opposite to the first transparent electrode. Accordingly, the entire thickness of the liquid crystal display apparatus may be decreased, and the manufacturing cost of the liquid crystal display apparatus may be reduced.

24 Claims, 12 Drawing Sheets

LIGHT GUIDE PLATE AND LIQUID CRYSTAL DISPLAY HAVING THE SAME

CROSS-REFERENCE TO RELATED APPLICATIONS

This application is a Continuation of U.S. application Ser. No. 10/525,060 filed on Jan. 19, 2006, now U.S. Pat. No. 7,405,774 which claims priority to International Application No. PCT/KR2003/001084 filed on Jun. 3, 2003, which claims priority to Korean Application Nos. 2002-0049272 filed on Aug. 20, 2002, 2002-0049273 filed on Aug. 20, 2002, and 2002-0068250 filed on Nov. 5, 2002, the disclosures of which are hereby incorporated herein by reference in their entirety.

TECHNICAL FIELD

The disclosure relates to a liquid crystal display (LCD) apparatus, and more particularly to a liquid crystal display apparatus having a touch panel.

DISCUSSION OF RELATED ART

A touch panel is a device for detecting a position of an object or a finger while the object or finger is touched on a point of the screen of a display device.

FIG. 1 is a cross sectional view showing a conventional liquid crystal display apparatus.

Referring to FIG. 1, the liquid crystal display apparatus includes a liquid crystal display panel 20 for displaying an image and a touch panel for detecting a position of an object that touches an outer surface of the touch panel.

The liquid crystal display panel 20 includes a thin film transistor (TFT) substrate 21, a color filter (C/F) substrate 23 and a liquid crystal layer 25 interposed between the TFT substrate 21 and the color filter substrate 23. A pixel electrode 22 is formed on an upper surface of the TFT substrate. The color filter substrate 23 faces the TFT substrate 21, and a common electrode 24 is formed on a lower surface of the color filter substrate.

A first polarizer 26 is formed on a lower surface of the TFT substrate 21, and a second polarizer 27 is formed on an upper surface of the color filter substrate 23.

The touch panel 30 includes a first substrate 31, a second substrate 34, a first transparent electrode 32 and a second transparent electrode 35. The second substrate is spaced apart from the first substrate by a predetermined distance. The first transparent electrode 32 is formed on an upper surface of the first substrate 31, and the second transparent electrodes 35 is formed on a lower surface of the second substrate 34. The upper surface of the first substrate 31 is opposite to the lower surface of the second substrate 34.

The first substrate 31 is comprised of a transparent material so that the light from the liquid crystal display panel may be transmitted through the first substrate 31. The second substrate 34 is comprised of an optical film having an isotropic refractivity.

The entire thickness of the liquid crystal display apparatus 10 is increased due to two substrates such as the color filter substrate 23 and the first substrate 31 disposed on both surfaces of the second polarizer 27.

In addition, loss of light is increased since the light incident into the liquid crystal display panel 20 and the light exiting from the liquid crystal display panel 20 pass through both color filter substrate 23 and first substrate 31.

SUMMARY OF THE INVENTION

Accordingly, the present invention is provided to substantially obviate one or more problems due to limitations and disadvantages of the related art.

It is one feature of the present invention to provide a liquid crystal display apparatus having a reduced thickness and manufacturing cost.

According to an aspect of the present invention for achieving one feature of the present invention, there is provided a liquid crystal display apparatus comprising: a liquid crystal display panel for displaying an image; and a touch panel including i) a first retardation member being disposed on an upper surface of the liquid crystal display panel, ii) a first transparent electrode disposed on the first retardation member iii) a second transparent electrode separated from the first transparent electrode by a predetermined distance, iv) a second retardation member disposed on the second transparent electrode, and v) a first polarizing member disposed on the second retardation member, and the touch panel detecting a point where the first transparent electrode is electrically connected to the second transparent electrode to detect a position of an object that touches an outer surface of the touch panel.

According to another aspect of the present invention for achieving the fifth feature of the present invention, there is provided a liquid crystal display apparatus comprising: a liquid crystal display panel for displaying an image; and a touch panel including i) a first transparent electrode disposed on an upper surface of the liquid crystal display panel, ii) a second transparent electrode separated from the first transparent electrode by a predetermined distance, iii) a first retardation member disposed on the second transparent electrode, iv) a second retardation member disposed on the first retardation member, and v) a first polarizing member disposed on the second retardation member, and the touch panel detecting a point at which the first transparent electrode is electrically connected to the second transparent electrode to detect a position of an object that touches an outer surface of the touch panel.

According to still another aspect of the present invention for achieving the fifth feature of the present invention, there is provided a liquid crystal display apparatus comprising: a liquid crystal display panel for displaying an image; and a touch panel including i) a first transparent electrode disposed on an upper surface of the liquid crystal display panel, ii) a second transparent electrode separated from the first transparent electrode by a predetermined distance, iii) an optical film disposed on the second transparent electrode, iv) a first polarizing member disposed on the optical film, and v) a spacer disposed between the first and second transparent electrodes, and the touch panel detecting a point at which the first transparent electrode is electrically connected to the second transparent electrode to detect a position of an object that touches an outer surface of the touch panel.

According to above liquid crystal display apparatus, the liquid crystal display panel and the polarizing member respectively substitute for a first substrate for supporting the first transparent electrode and a second substrate for supporting the second transparent electrode. Accordingly, an unnecessary substrate that causes the increase of the thickness of the liquid crystal display apparatus may be removed, the entire thickness of the liquid crystal display apparatus may be decreased, and the manufacturing cost of the liquid crystal display apparatus may be reduced.

According to the present invention, the liquid crystal display apparatus includes first and second transparent electrodes. The first and second transparent electrodes are comprised of a transparent conductive material and are spaced apart from each other by a predetermined distance.

The first transparent electrode is supported by the second transparent substrate of the color filter substrate. The second transparent electrode is supported by the polarizer.

Accordingly, another substrate that supports the first and second transparent electrodes may be removed, the entire thickness of the liquid crystal display apparatus may be decreased, and the manufacturing cost of the liquid crystal display apparatus may be reduced.

In addition, the number of the transparent substrates, through which the light incident into the liquid crystal display panel or the light exiting from the liquid crystal display panel is transmitted, is reduced, thereby reducing loss of light and enhancing optical characteristics of the liquid crystal display apparatus.

BRIEF DESCRIPTION OF THE DRAWINGS

The above and other advantages of the present invention will become more apparent by describing in detail exemplary embodiments thereof with reference to the accompanying drawings, in which.

DESCRIPTION OF EXEMPLARY EMBODIMENTS

Hereinafter the preferred embodiment of the present invention will be described in detail with reference to the accompanying drawings.

Figure 1:
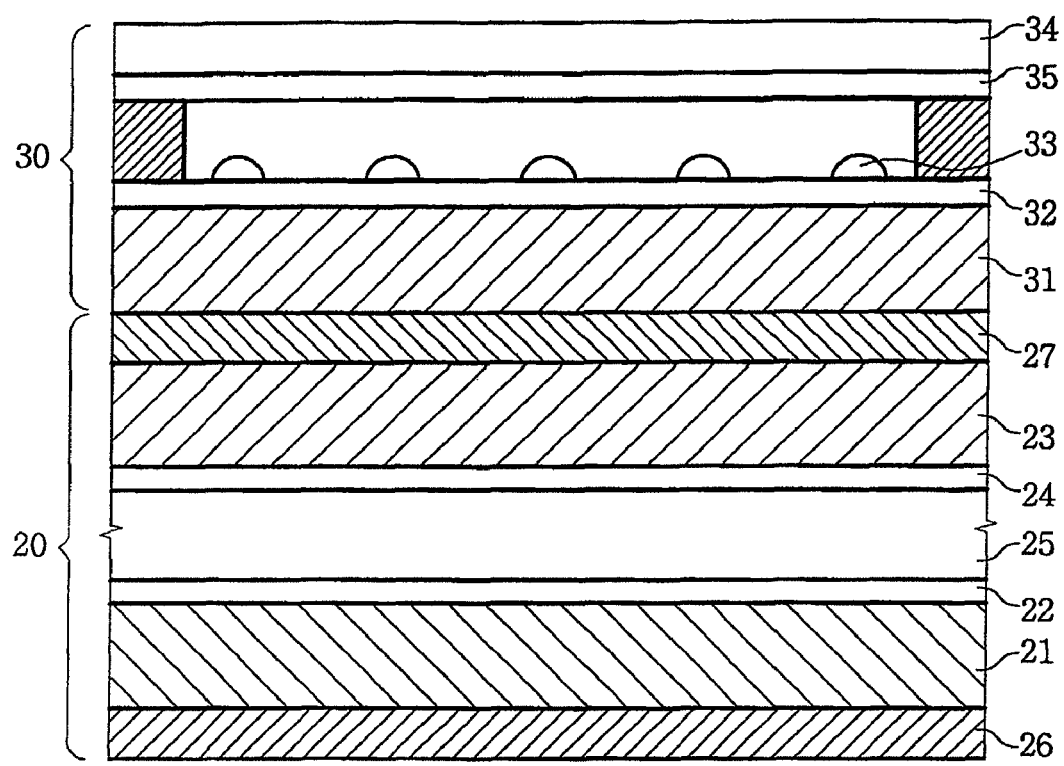
FIG. 1 is a cross sectional view showing a conventional liquid crystal display apparatus.
Figure 2:
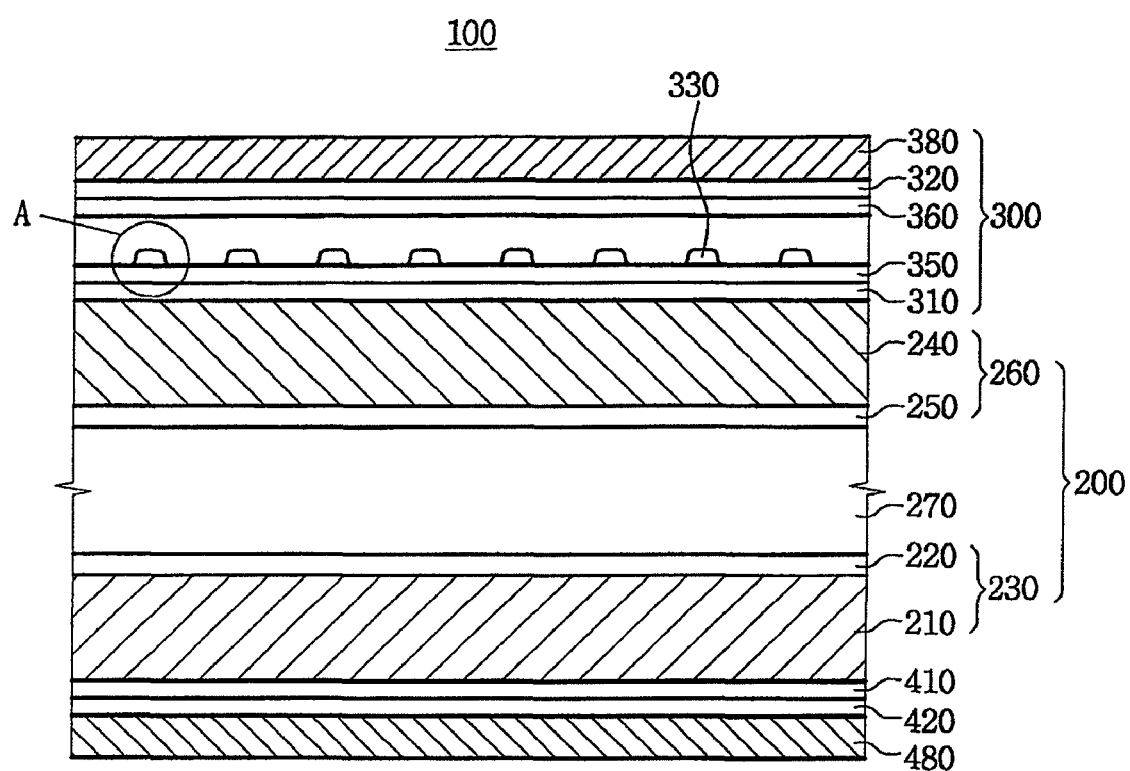
FIG. 2 is a cross sectional view showing a liquid crystal display apparatus according to a first exemplary embodiment of the present invention.

FIG. 2 is a cross sectional view showing a liquid crystal display apparatus according to a first exemplary embodiment of the present invention.

Referring to FIG. 2, the liquid crystal display apparatus 100 according to the first embodiment of the present invention includes a liquid crystal display panel 200, a touch panel 300 and a plurality of optical plates 410, 420 and 480 disposed on a lower surface of the liquid crystal display panel 200. The liquid crystal display panel 200 displays an image. The touch panel 300 detects a position of an object that touches an outer surface of the touch panel.

The liquid crystal display panel 200 includes a TFT substrate 230, a color filter substrate 260 facing the TFT substrate 230, and a liquid crystal layer 270 interposed between the TFT substrate 230 and the color filter substrate 260.

The TFT substrate 230 includes a plurality of switching devices (not shown) and a plurality of pixel electrodes each electrically connected with each of the switching devices. The switching devices are formed on the first transparent substrate 210. The color filter substrate 260 includes color filters (not shown) and a common electrode 250 formed on the color filters. The color filters are formed on the second transparent substrate 240.

The touch panel 300 includes a first retardation film (or phase difference film) 310, a second retardation film 320 and a first polarizer 380 disposed on an upper surface of the second retardation film 320. The first retardation film 310 is disposed on an upper surface of the color filter substrate 260, and a first transparent electrode 350 is formed on the first retardation film 310. A second transparent electrode 360 that is spaced apart from the first transparent electrode 350 by a predetermined distance is formed on the second retardation film 320. The first retardation film 310 is a $\lambda/4$ retardation film, and the second retardation film 320 is a $\lambda/2$ retardation film.

The first and second transparent electrodes 350 and 360 are comprised of a transparent conductive material such as indium tin oxide (ITO) or indium zinc oxide (IZO).

An adhesive (not shown) comprised of insulating material is interposed between the first and second transparent electrodes 350 and 360. The adhesive combines the first and second transparent electrodes 350 and 360 with each other. The first transparent electrode 350 is separated from the second transparent electrode 360 by the thickness of the adhesive interposed between the first and second transparent electrodes 350 and 360.

A plurality of spacers 330 is formed on the first transparent electrode 350. The spacers 330 may be formed on the second transparent electrode 360.

A third retardation film 410, a fourth retardation film 420 and a second polarizer 480 may be disposed on a lower surface of the liquid crystal display panel 200.

The third retardation film 410 is disposed on the lower surface of the liquid crystal display panel 200, the fourth retardation film 420 is disposed on a lower surface of the third retardation film 410, and the second polarizer 480 is disposed on a lower surface of the fourth retardation film 420. The third retardation film 410 is a $\lambda/4$ retardation film, and the fourth retardation film 420 is a $\lambda/2$ retardation film.

The first, second, third and fourth retardation films 310, 320, 410 and 420 are comprised of polyarylate or polyether sulfone. The polyarylate is thermoplastic resin of aromatic polyester.

The first retardation film 310 on which the first transparent electrode 350 is formed is supported by the second transparent substrate 240 or the color filter substrate. The second retardation film 320 on which the second transparent electrode 360 is formed is supported by the first polarizer 380. Accordingly, an unnecessary substrate that causes the increase in the thickness of the liquid crystal display apparatus may be removed, the entire thickness of the liquid crystal display apparatus may be decreased, and the manufacturing cost of the liquid crystal display apparatus may be reduced.

Although the above embodiments show a reflective and transmissive type liquid crystal display panel, a reflective liquid crystal display panel could be utilized to display an image, as would be known to one of the ordinary skill in the art. The liquid crystal display apparatus 100 may not have the third retardation film 410, the fourth retardation film 420 and the second polarizer 480.

Figure 3:
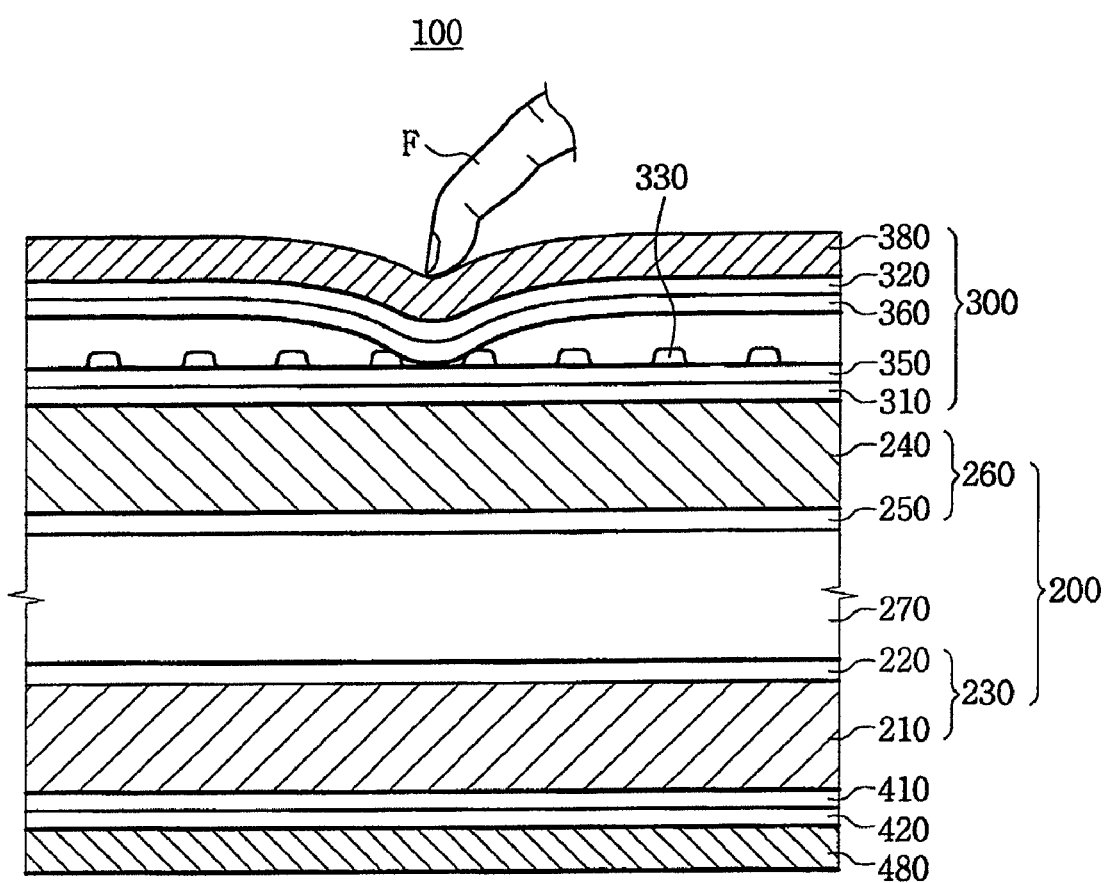
FIG. 3 is a schematic view showing the liquid crystal display apparatus of FIG. 2 when a touch screen is pressed down.
Figure 4:
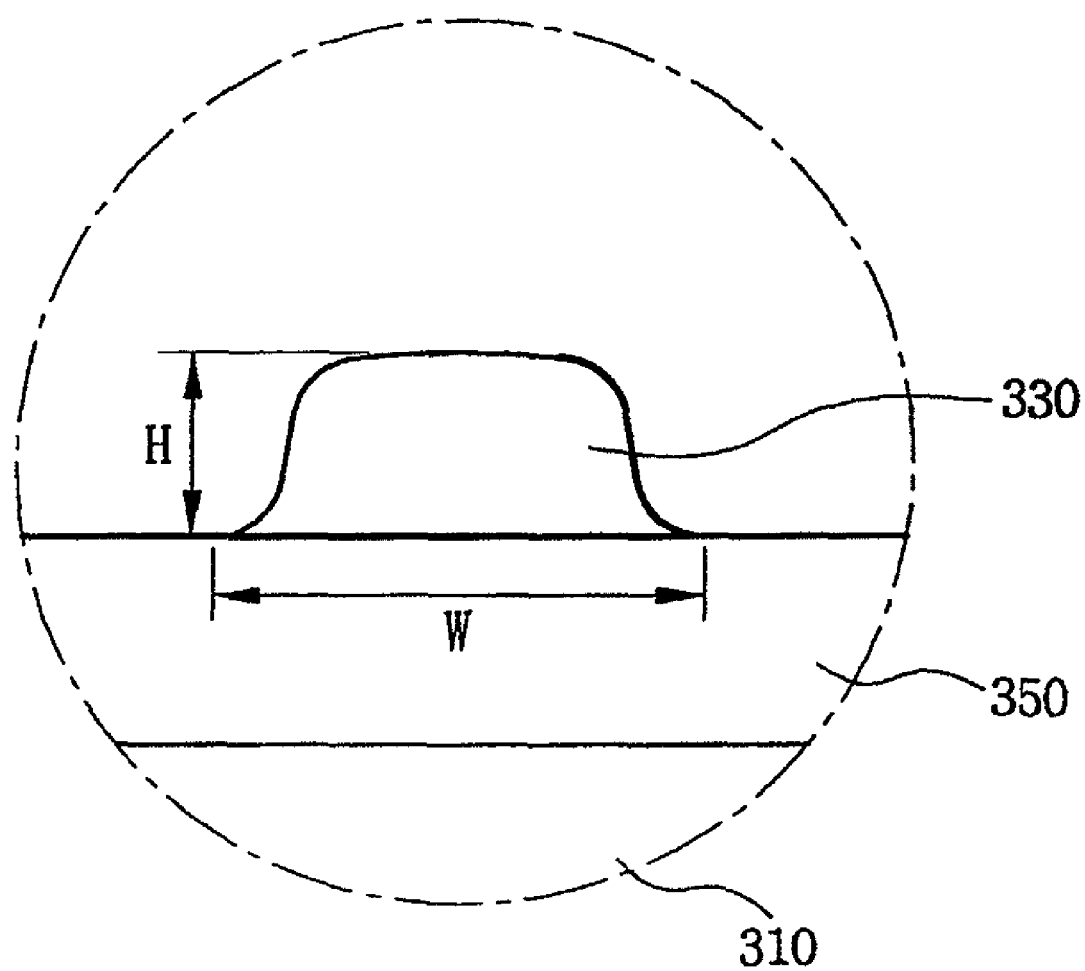
FIG. 4 is an enlarged view of a portion 'A' in FIG. 2.

FIG. 3 is a schematic view showing the liquid crystal display apparatus of FIG. 2 when a touch screen is pressed down, and FIG. 4 is an enlarged view of a portion 'A' of FIG. 2.

Referring to FIGS. 3 and 4, the first and second transparent electrodes 350 and 360 of the liquid crystal display apparatus 100 make electrical contact with each other by an object such as a finger of a user.

The first polarizer 380 is pressed down by the user's finger when the user inputs information through the touch panel.

The first and second transparent electrodes 350 and 360 are comprised of a transparent conductive material having resistive property. The first and second transparent electrodes 350 and 360 have linear voltage distribution when current is applied to the first and second transparent electrodes 350 and 360.

Accordingly, when the first and second transparent electrodes 350 and 360 make contact with each other by the finger of the user, the voltage of the contact point between the first and second transparent electrodes 350 and 360 is measured, so that the position of an object that touches an outer surface of the touch panel can be detected.

A plurality of spacers 330 is formed on the first transparent electrode 350. A height of each of the spacers 330 is smaller than the distance between the first and second transparent electrodes 350 and 360.

The spacers 330 have a dot shape. Although the above embodiments discuss a spacer having a dot shape, a spacer having circular cylinder, elliptic cylinder shape or any other shapes known to one of the ordinary skill in the art may also be utilized in place of or in conjunction with the spacer having a dot shape.

A width of the lower face of the spacer 330 may be wider a width of the upper face of the spacer 330. For example, the width of the lower face of the spacer 330 may be between about 10 μm and about 80 μm, and the height of the spacer 330 may be between about 2 μm and about 20 μm.

The spacers 330 absorb the impact on the first and second transparent electrodes 350 and 360 when the second transparent electrode 360 is pressed and makes contact with the first transparent electrode 350. In addition, the spacers 330 provide the second transparent electrode 360 with restoring forces so that the second transparent electrode 360 is separated from the first transparent electrode 350 when the user takes off (or withdraws) his finger from the touch panel 300.

Figure 5:
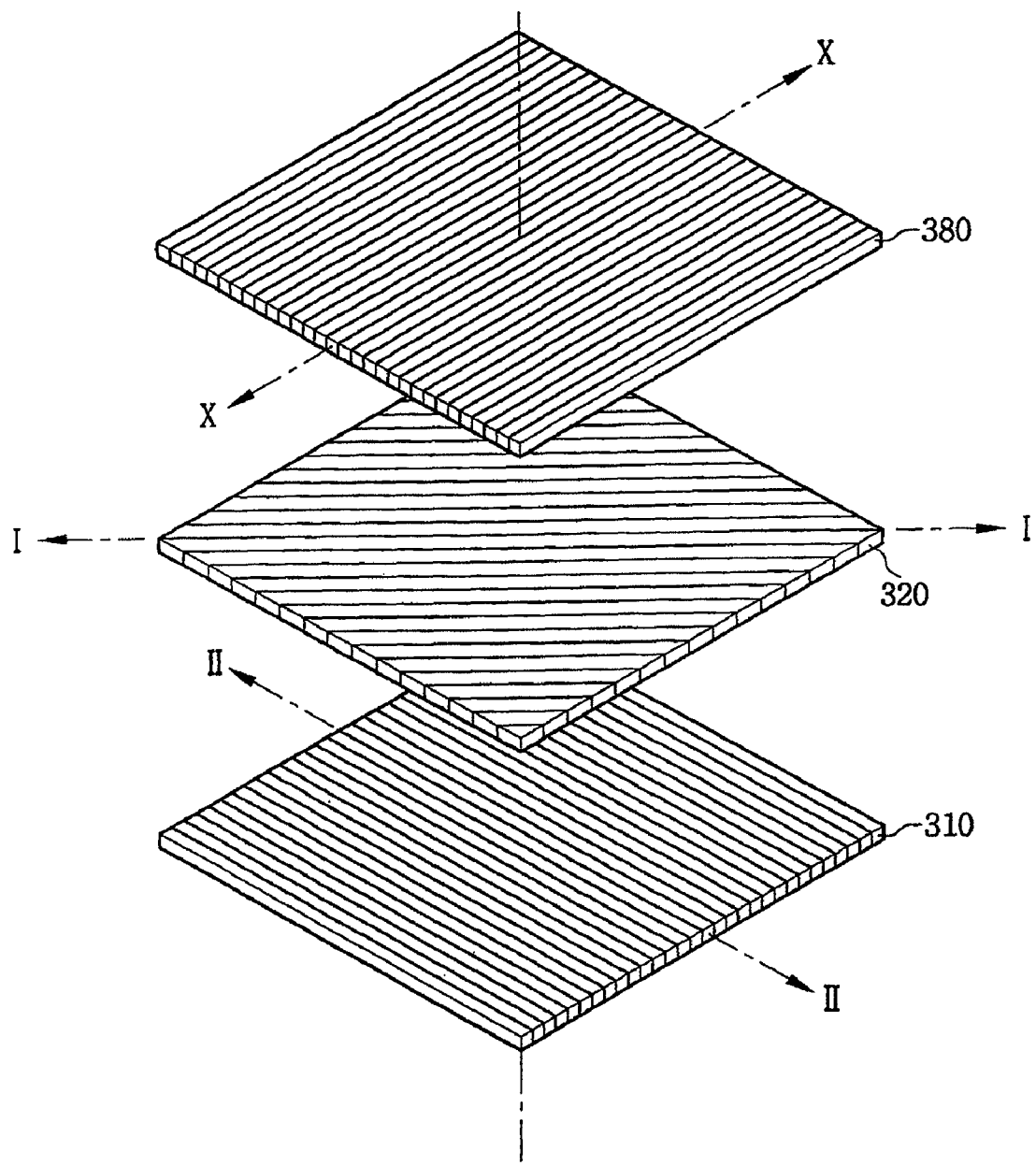
FIG. 5 is a schematic view showing an arrangement among a first polarizing film, a first retardation film and a second retardation film.

FIG. 5 is a schematic view showing an arrangement among a first polarizing film, a first retardation film and a second retardation film.

Referring to FIG. 5, the first retardation film 310, the second retardation film 320 and the first polarizer 380 are arranged so as to enhance the optical characteristic of the light from the liquid crystal display panel 200.

An X-axis is referred to as a polarizing axis of the first polarizer 380, an I-axis is referred to as a retardation axis of the second retardation film 320, and an II-axis is referred to as a retardation axis of the first retardation film 310.

The second retardation film 320 is disposed under the first polarizer 380 so that the I-axis forms an angle between about 45° and about 135° with respect to the II-axis. In addition, the first retardation film 310 is disposed under the second retardation film 320 so that the II-axis forms an angle between about 90° and about 180° with respect to the X-axis.

The third retardation film 410, the fourth retardation film 420 and the second polarizer 480 of FIG. 2 are arranged in the same manner as the first retardation film 310, the second retardation film 320 and the first polarizer 380.

Figure 6:
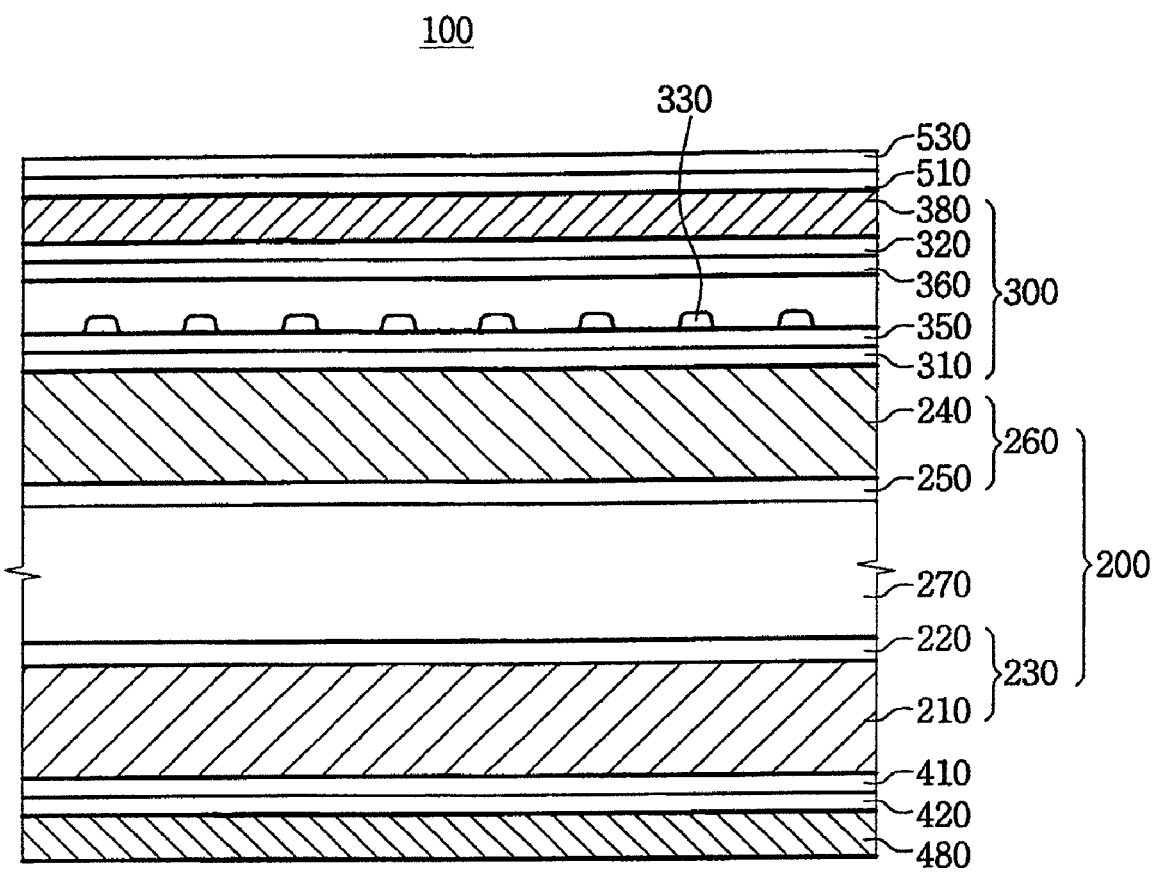
FIG. 6 is a cross sectional view showing a liquid crystal display apparatus that further includes a hard coated film and a reflection protection film in addition to the liquid crystal display apparatus of FIG. 2.

FIG. 6 is a cross sectional view showing a liquid crystal display apparatus that further includes a hard coated film and a reflection protection film in addition to the liquid crystal display apparatus of FIG. 2.

Referring to FIG. 6, the hard coated film 510 and the reflection protection film 530 is disposed sequentially on the first polarizer 380.

A portion of the surface of the first polarizer 380 in the touch panel 300 may be pressed down by the object or the finger of the user many times until the liquid crystal display apparatus may reach the expected life span thereof.

Accordingly, the surface of the first polarizer 380 may be easily damaged by the repeated pressing actions. The hard coated film 510 is formed on the first polarizer 380 so that the first polarizer 380 should not be damaged. The hard coated film 510 may be comprised of polyacryl resin.

The reflection protection film 530 is formed on the hard coated film 510, and prevents light from being reflected from the surface of the hard coated film 510.

Although only the hard coated film 510 is formed on the first polarizer 380, the hard coated film may prevent the light incident thereonto from being reflected therefrom because the hard coated film 510 absorbs external light incident thereonto.

In addition, only the reflection protection film 530 without the hard coated film 510 may protect the surface of the first polarizer 380 when the reflection protection film 530 has Mohs hardness of about 3 or more.

Figure 7:
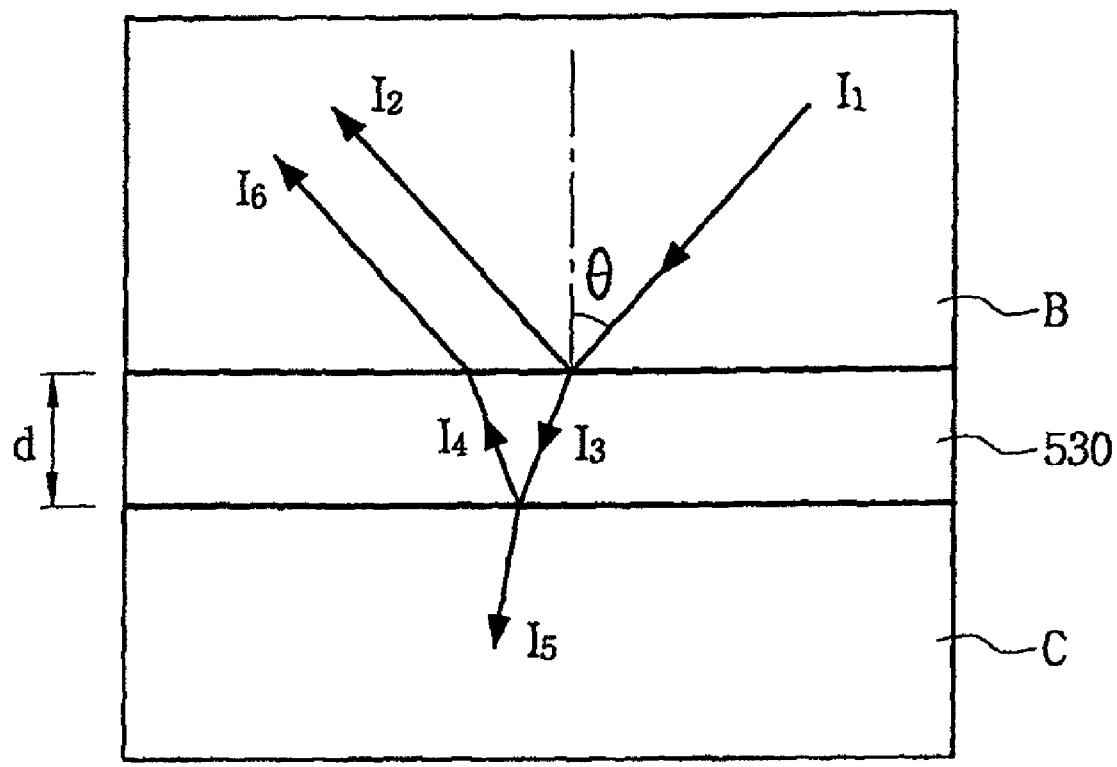
FIG. 7 is a schematic view showing the reflection protection film.

FIG. 7 is a schematic view showing the reflection protection film;

Referring to FIG. 7, a first light I1 is incident onto the reflection protection film 530 from a first medium B in an incident angle θ. A portion of the first light I1 is reflected from the reflection protection film 530 in the angle θ to be a second light I2. A remaining portion of the first light I1 is refracted toward the reflection protection film 530 as a third light I3.

The third light I3 advances into the reflection protection film 530, a portion of the third light I3 is reflected from an interface between the reflection protection film 530 and a second medium C to be a fourth light I4. A remaining portion of the third light I3 is refracted toward the second medium C to be a fifth light I5.

The fourth light I4 exits toward the first medium and is refracted as a sixth light I6.

The phase of the reflected light is not varied when the light advancing from a medium having high refractivity toward a medium having a low refractivity is reflected from the interface between the two mediums. The phase of the reflected light is varied by 180° when the light advancing from a medium having low refractivity toward a medium having a high refractivity is reflected from the interface between the two mediums. However, the phase of the transmitted light is not varied.

The thickness d of the reflection protection film 530 is determined in view of the refractivity $n_a$ of the reflection protection film 530, the refractivities $n_b$ and $n_c$ of the first and second medium B and C so that the second light I2 and the sixth light I6 are interfered with each other to disappear by a destructive interference on the surface of the reflection protection film 530.

Accordingly, reflection phenomenon on the surface of the reflection protection film 530 may be prevented.

Figure 8A:
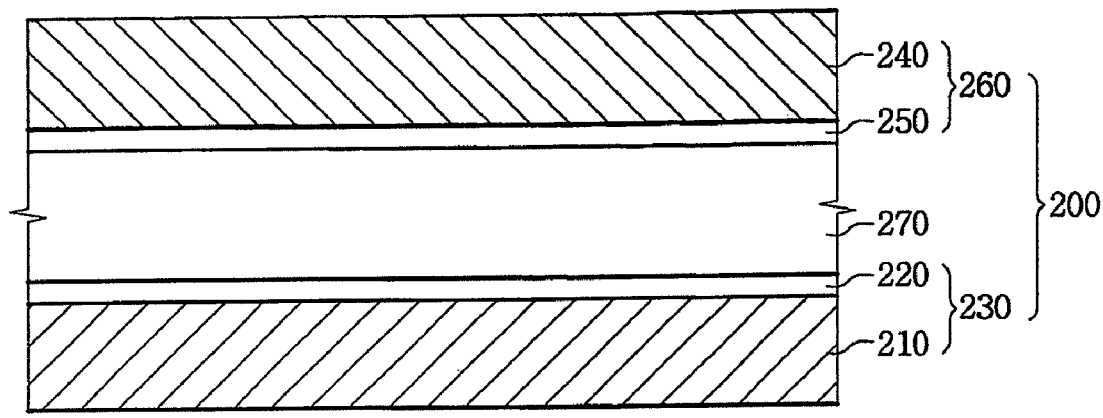
FIGS. 8A, 8B and 8C are cross sectional views showing a method of manufacturing the liquid crystal display apparatus according to the first exemplary embodiment of the present invention.
Figure 8B:
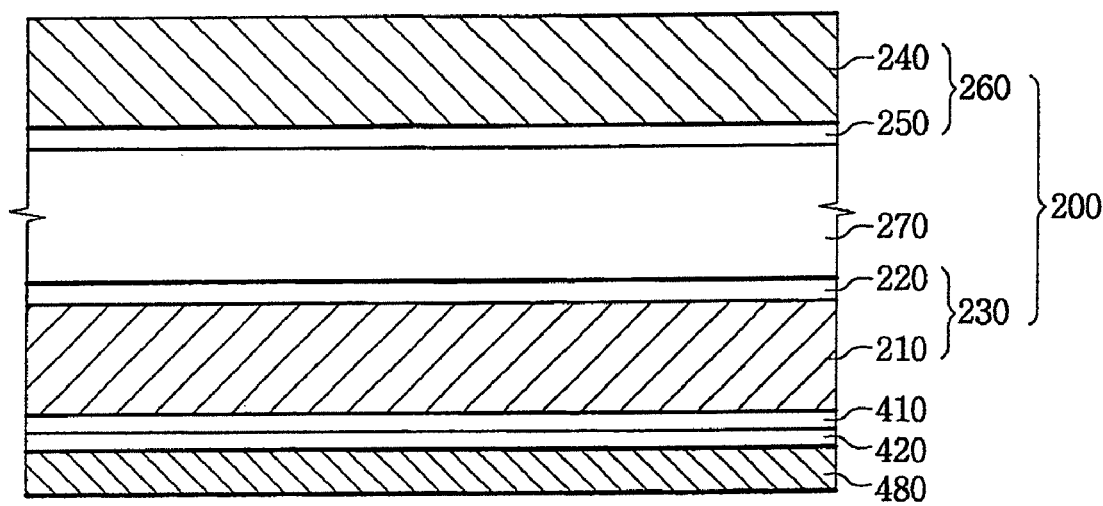
Figure 8C:
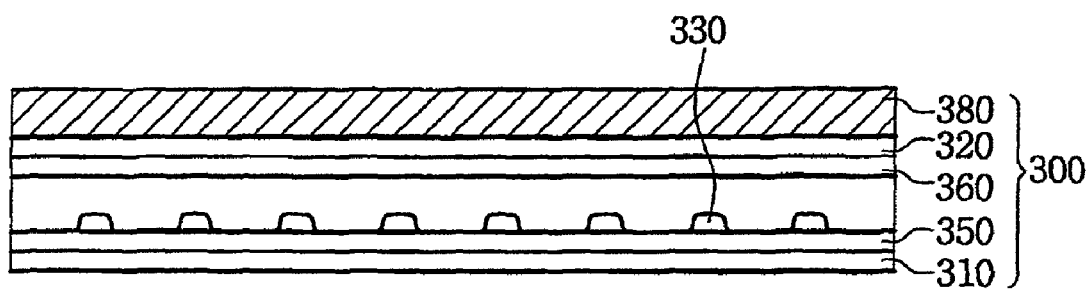

FIGS. 8A, 8B and 8C are cross sectional views showing a method of manufacturing the liquid crystal display apparatus according to the first exemplary embodiment of the present invention.

Referring to FIG. 8A, first, a liquid crystal display panel 200 is formed. The liquid crystal display panel 200 has a TFT substrate 230, a color filter substrate 260 facing the TFT substrate 230 and a liquid crystal layer 270 interposed between the TFT substrate 230 and the color filter substrate 260.

The TFT substrate 230 includes a plurality of switching devices (not shown) and a plurality of pixel electrodes, each of the pixel electrodes being electrically connected with each of the switching devices. The switching devices are formed on a first transparent substrate 210. The color filter substrate 260 includes color filters (not shown) and a common electrode 250 formed on the color filters. The color filters are formed on a second transparent substrate 240.

Referring to FIG. 8B, a third retardation film 410, a fourth retardation film 420 and a second polarizer 480 are formed on a lower surface of the liquid crystal display panel 200.

In detail, the third and fourth retardation films 410 and 420 are formed successively on the second polarizer 480. Then, the second polarizer 480 having the third and fourth retardation films 410 and 420 is attached to the lower surface of the liquid crystal display panel 200. The first transparent substrate 210 makes contact with the third retardation film 410.

Referring to FIG. 8C, a second retardation film 320 is formed on the first polarizer 380. Then, a transparent conductive material such as ITO or IZO is deposited on the second retardation film 320, thereby forming a second transparent electrode 360.

A first transparent electrode 350 is formed on the first retardation film 310. A transparent conductive material such as ITO or IZO is deposited on the first retardation film 310, thereby forming a first transparent electrode 350.

Then, a plurality of spacers 330 is formed on the first transparent electrode 350, an adhesive (not shown) comprised of insulating material is formed at the boundary portion of the first transparent electrode 350.

The first transparent electrode 350 faces the second transparent electrode 360. The second transparent electrode 360 is attached to the first transparent electrode 350 by means of the adhesive formed on the boundary portion of the first transparent electrode 350. The first and second transparent electrodes 350 and 360 are separated from each other by the thickness of the adhesive.

Then, the first retardation film 310 is combined with the second transparent electrode 240 of the color filter substrate 260 of FIG. 2, thereby completing the liquid crystal display apparatus 100 of FIG. 2

The step illustrated in FIG. 8C may be performed prior to the step illustrated in FIG. 8B.

FIGS. 9A, 9B, 9C and 9D are cross sectional views showing a method of forming the spacer of FIG. 4.

Figure 9A:
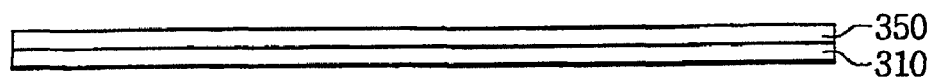
FIGS. 9A, 9B, 9C and 9D are cross sectional views showing a method of forming the spacer of FIG. 4.

Referring to FIG. 9A, the first transparent electrode 350 comprised of a transparent conductive material such as ITO or IZO is formed on the first retardation film 310.

Figure 9B:
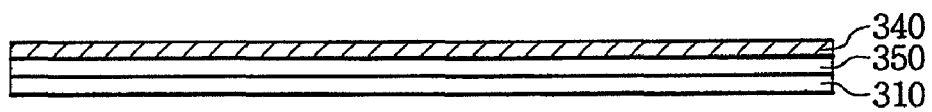

Then, as shown in FIG. 9B, a photosensitive organic layer 340 is deposited in a uniform thickness on the first retardation film 310.

Figure 9C:
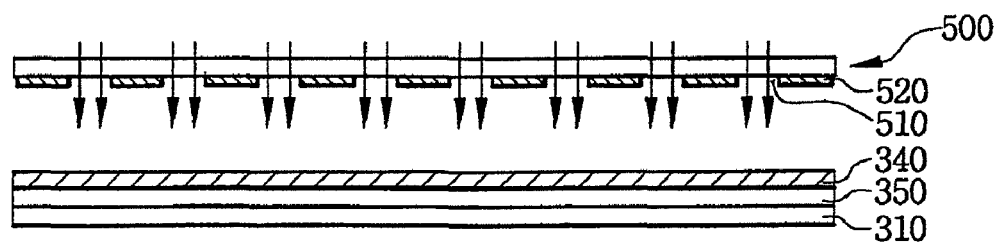
Figure 9D:
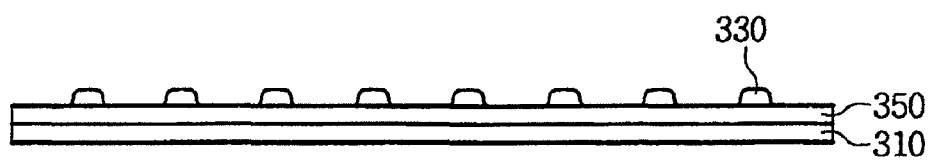

Referring to FIG. 9C, a mask 500 is aligned over the photosensitive organic layer 340. The mask 500 has a transmitting layer for transmitting light therethrough and the blocking layer for blocking the light. Then, an exposure process is performed by means of the mask 500. In detail, ultra violet is applied onto the photosensitive organic layer 340 through the mask 500.

The photosensitive organic layer 340 deposited on the first transparent electrode 350 may be a negative photoresist, and the exposed area of the photosensitive organic layer 340 onto which UV light is supplied is polymerized. Accordingly, an unexposed area that is not polymerized is etched away by a developer solution, thereby forming the spacers 330 of FIG. 9D. A baking process may be further performed so as to cure the spacers 330.

Figure 10:
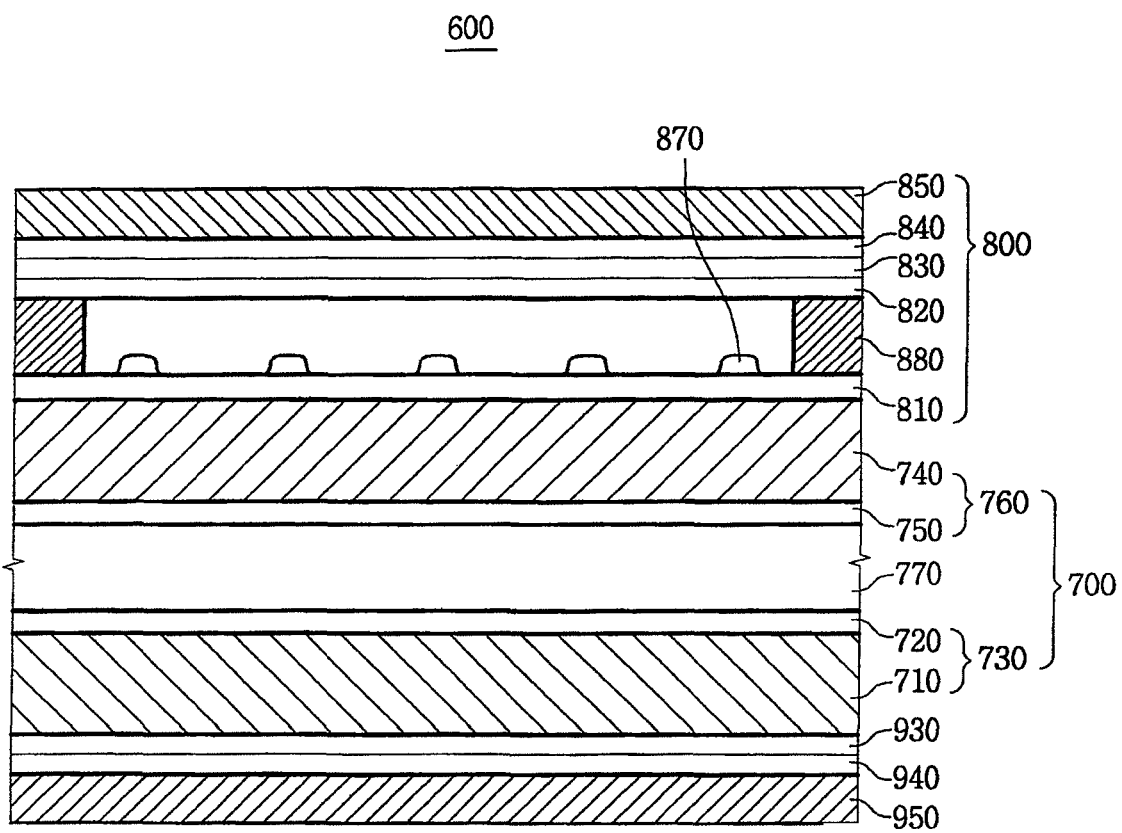
FIG. 10 is a cross sectional view showing a liquid crystal display apparatus according to a second exemplary embodiment of the present invention.

FIG. 10 is a cross sectional view showing a liquid crystal display apparatus according to a second exemplary embodiment of the present invention.

Referring to FIG. 10, the liquid crystal display apparatus 600 according to the second exemplary embodiment of the present invention includes a liquid crystal display panel 700, a touch panel 800 and a plurality of optical plates 930, 940 and 950. The liquid crystal display panel 700 displays an image, and the touch panel 800 detects the position of the object that touches an outer surface of the touch panel 800. The optical plates 930, 940 and 950 are disposed on the lower surface of the liquid crystal display panel 700.

The liquid crystal display panel 700 includes a TFT substrate 730, a color filter substrate 760 facing the TFT substrate 730, and a liquid crystal layer 770 interposed between the TFT substrate 730 and the color filter substrate 760.

The TFT substrate 730 includes a plurality of switching devices (not shown) and a plurality of pixel electrodes each of which is electrically connected with each of the switching devices. The switching devices are formed on the first transparent substrate 710. The color filter substrate 760 includes color filters (not shown) and a common electrode 750 formed on the color filters. The color filters are formed on the second transparent substrate 740.

The touch panel 800 includes a first transparent electrode 810, a second transparent electrode 820, first and second retardation films 830 and 840 disposed on an upper surface of the second transparent electrode 820, and a first polarizer 850 disposed on the second retardation film 840. The first transparent electrode 810 is disposed on an upper surface of the color filter substrate 760, and the second transparent electrode 820 is separated from the first transparent electrode 810 by a predetermined distance.

The first retardation film 830 is a λ4 retardation film, and the second retardation film 840 is a λ2 retardation film. The first and second transparent electrodes 810 and 820 are comprised of a transparent conductive material such as indium tin oxide (ITO) or indium zinc oxide (IZO).

An adhesive (not shown) comprised of an insulating material is interposed between the first and second transparent electrodes 810 and 820. The adhesive combines the first and second transparent electrodes 810 and 820 with each other. The first transparent electrode 810 is separated from the second transparent electrode 820 by the thickness of the adhesive interposed between the first and second transparent electrodes 810 and 820.

A plurality of spacers 870 is formed on the first transparent electrode 810. The spacers 870 may be formed on the second transparent electrode 820.

A detailed description about the spacer 870 will be omitted because the spacer 870 is the same as the spacer 330 of FIG. 4.

A third retardation film 930, a fourth retardation film 940 and a second polarizer 950 may be disposed on a lower surface of the liquid crystal display panel 700.

The third retardation film 930 is disposed on the lower surface of the liquid crystal display panel 700, the fourth retardation film 940 is disposed on a lower surface of the third retardation film 930, and the second polarizer 950 is disposed on a lower surface of the fourth retardation film 940. The third retardation film 930 is a λ4 retardation film, and the fourth retardation film 940 is a λ2 retardation film.

The first, second, third and fourth retardation films 830, 840, 930 and 940 are comprised of polyarylate or polyether sulfone resin.

The first retardation film 830, the second retardation film 840 and the first polarizer 850 are arranged so as to enhance the optical characteristic of the light from the liquid crystal display panel 700.

The second retardation film 840 is disposed under the first polarizer 850 so that the a polarizing axis of the first polarizer 850 forms an angle between about 45° and about 135° with respect to a retardation axis of the second retardation film 840. In addition, the first retardation film 830 is disposed under the second retardation film 840 so that a polarizing axis of the first polarizer 850 forms an angle between about 90° and about 180° with respect to a retardation axis of the first retardation film 830.

A third retardation film 930, a fourth retardation film 940 and a second polarizer 950 are arranged in the same manner as the first retardation film 830, the second retardation film 840 and the first polarizer 850.

In addition, the hard coated film and the reflection protection film illustrated in FIG. 6 may be further formed on the first polarizer 530.

The first retardation film 310 on which the first transparent electrode 350 is formed is supported by the second transparent substrate 240 or the color filter substrate.

The first transparent electrode 810 is supported by the second transparent substrate 740 of the color filter substrate 760. The second transparent electrode 820 is supported by the first polarizer 850. Accordingly, an unnecessary substrate that causes the increase of the thickness of the liquid crystal display apparatus may be removed, the entire thickness of the liquid crystal display apparatus may be decreased, and the manufacturing cost of the liquid crystal display apparatus may be reduced.

Although the above embodiments discuss a reflective and transmissive type liquid crystal display panel, a reflective liquid crystal display panel could be utilized to display an image, as would be known to one of the ordinary skill in the art. The liquid crystal display apparatus 600 may not have the third retardation film 930, the fourth retardation film 940 and the second polarizer 950.

Figure 11:
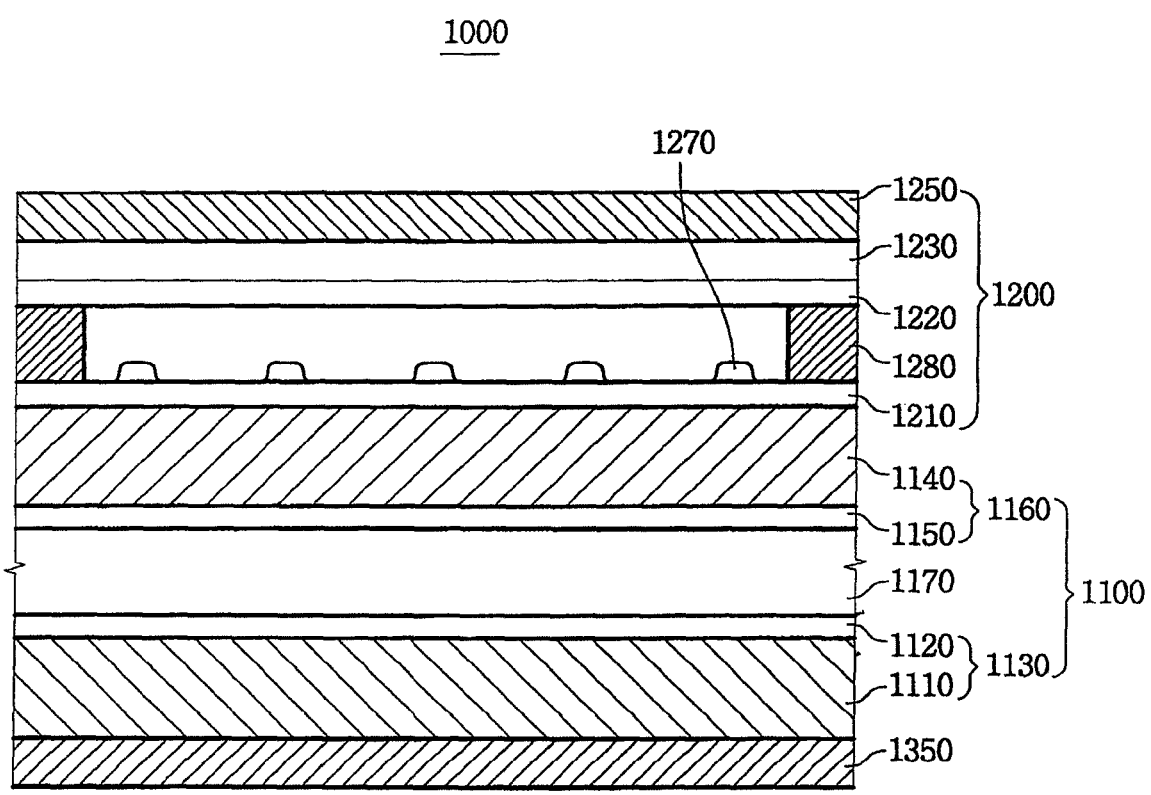
FIG. 11 is a cross sectional view showing a liquid crystal display apparatus according to a third exemplary embodiment of the present invention.

FIG. 11 is a cross sectional view showing a liquid crystal display apparatus according to a third exemplary embodiment of the present invention.

Referring to FIG. 11, the liquid crystal display apparatus 1000 according to the third exemplary embodiment of the present invention includes a liquid crystal display panel 1100, a touch panel 1200 and a second polarizer 1350. The liquid crystal display panel 1100 displays an image, and the touch panel 1200 detects the position of the object that touches an outer surface of the touch panel 1200. The second polarizer 1350 is disposed on a lower surface of the liquid crystal display panel 1100.

The liquid crystal display panel 1100 includes a TFT substrate 1130, a color filter substrate 1160 facing the TFT substrate 1130, and a liquid crystal layer 1170 interposed between the TFT substrate 1130 and the color filter substrate 1160.

The TFT substrate 1130 includes a plurality of switching devices (not shown) and a plurality of pixel electrodes 1120 each of which is electrically connected with each of the switching devices. The switching devices are formed on the first transparent substrate 1110. The color filter substrate 1160 includes color filters (not shown) and a common electrode 1150 formed on the color filters. The color filters are formed on the second transparent substrate 1140

The touch panel 1200 includes a first transparent electrode 1210, a second transparent electrode 1220, an optical film 1230 and a first polarizer 1250. The first transparent electrode 1210 is disposed on an upper surface of the color filter substrate 1160, and the second transparent electrode 1220 is separated from the first transparent electrode 1210 by a predetermined distance. The optical film 1230 is disposed on an upper surface of the second transparent electrode 1220, and the first polarizer 1250 is disposed on an upper surface of the optical film 1230.

The optical film 1230 is comprised of a material having an isotropic refractivity such as polycarbonate.

An adhesive 1280 comprised of an insulating material is interposed between the first and second transparent electrodes 1210 and 1220. The adhesive 1280 combines the first and second transparent electrodes 1210 and 1220 with each other. The first transparent electrode 1210 is separated from the second transparent electrode 1220 by the thickness of the adhesive interposed between the first and second transparent electrodes 1210 and 1220.

A plurality of spacers 1270 is formed on the first transparent electrode 1210. The spacers 1270 may be formed on the second transparent electrode 1220.

A detailed description about the spacer 1270 will be omitted because the spacer 1270 is the same as the spacer 330 of FIG. 4.

A second polarizer 1350 may be disposed on a lower surface of the liquid crystal display panel 1100.

In addition, the hard coated film and the reflection protection film illustrated in FIG. 6 may be further formed on the first polarizer 1250.

The first transparent electrode 1210 is supported by the second transparent substrate 1140 of the color filter substrate 1160. The second transparent electrode 1220 is supported by the first polarizer 1250. Accordingly, an unnecessary substrate that causes the increase of the thickness of the liquid crystal display apparatus may be removed, the entire thickness of the liquid crystal display apparatus may be decreased, and the manufacturing cost of the liquid crystal display apparatus may be reduced.

Although the above embodiment discuss a reflective and transmissive type liquid crystal display panel, a reflective liquid crystal display panel could be utilized to display an image, as would be known to one of the ordinary skill in the art. The liquid crystal display apparatus 1000 may not have the second polarizer 1350.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:
1. A liquid crystal display apparatus comprising:
 a liquid crystal display panel for displaying an image, the liquid crystal display panel including a lower substrate and an upper substrate; and a touch panel using the upper substrate of the liquid crystal display panel as a lower substrate of the touch panel, the touch panel including:
- a first retardation member disposed directly on the upper surface of the liquid crystal display panel;
- a first transparent electrode disposed directly on the first retardation member; and
- a second transparent electrode separated from the first transparent electrode by a predetermined distance.

2. The liquid crystal display apparatus of claim 1, further comprising a second retardation member disposed on the first retardation member.

3. The liquid crystal display apparatus of claim 2, wherein the first retardation member is a $\lambda/4$ retardation film, and the second retardation member is a $\lambda/2$ retardation film.

4. The liquid crystal display apparatus of claim 2, wherein a first retardation axis of the first retardation member forms a first angle between about 90° and about 180° with respect to a polarizing axis of the first polarizing member, and a second retardation axis of the second retardation member forms a second angle between about 45° and about 135° with respect to the polarizing axis of the first polarizing member.

5. The liquid crystal display apparatus of claim 1, further comprising a first polarizing member disposed on the second transparent electrode.

6. The liquid crystal display apparatus of claim 5, further comprising a hard coated film disposed on the first polarizing member to protect the first polarizing member.

7. The liquid crystal display apparatus of claim 5, further comprising a reflection protection film disposed on the first polarizing member to prevent a light from being reflected from a surface of the first polarizing member.

8. The liquid crystal display apparatus of claim 7, wherein the reflection protection film has a Mohs hardness of no less than about 3.

9. The liquid crystal display apparatus of claim 1, wherein the touch panel further includes a spacer disposed between the first and second transparent electrodes, the spacer having a diameter from about 10 μm to about 80 μm and a height from about 2 μm to about 10 μm.

10. The liquid crystal display apparatus of claim 1, further comprising:
- a third retardation member disposed on a lower surface of the lower substrate of the liquid crystal display panel; and
- a fourth retardation member disposed on the third retardation member.

11. The liquid crystal display apparatus of claim 10, wherein the third retardation members are $\lambda/4$ retardation films, and the fourth retardation members are $\lambda/2$ retardation films.

12. The liquid crystal display apparatus of claim 10, further comprising a second polarizing member disposed on a lower surface of the fourth retardation member.

13. The liquid crystal display apparatus of claim 1, wherein the touch panel detects a point where the first transparent electrode is electrically connected to the second transparent electrode to detect a position of an object that touches an outer surface of the touch panel.

14. A liquid crystal display apparatus comprising:
- a liquid crystal display panel for displaying an image, the liquid crystal display panel including a lower substrate and an upper substrate; and
- a touch panel using the upper substrate of the liquid crystal display panel as a lower substrate of the touch panel, the touch panel including:
- a first retardation member disposed directly on the upper surface of the liquid crystal display panel;
- a second retardation member disposed on the first retardation member;
- a first transparent electrode disposed directly on the second retardation member; and
- a second transparent electrode separated from the first transparent electrode by a predetermined distance.

15. The liquid crystal display apparatus of claim 14, wherein the first retardation member is a $\lambda/4$ retardation film, and the second retardation member is a $\lambda/2$ retardation film.

16. The liquid crystal display apparatus of claim 15, wherein a first retardation axis of the first retardation member forms a first angle between about 90° and about 180° with respect to a polarizing axis of the first polarizing member, and a second retardation axis of the second retardation member forms a second angle between about 45° and about 135° with respect to the polarizing axis of the first polarizing member.

17. The liquid crystal display apparatus of claim 14, further comprising a first polarizing member disposed on the first transparent electrode.

18. The liquid crystal display apparatus of claim 17, further comprising a hard coated film disposed on the first polarizing member to protect the first polarizing member.

19. The liquid crystal display apparatus of claim 18, further comprising a reflection protection film disposed on the hard coated film to prevent a light from being reflected from a surface of the first polarizing member.

20. The liquid crystal display apparatus of claim 14, further comprising:
- a third retardation member disposed on a lower surface of the lower substrate of the liquid crystal display panel; and
- a fourth retardation member disposed on the third retardation member.

21. The liquid crystal display apparatus of claim 20, wherein the third retardation members are $\lambda/4$ retardation films, and the fourth retardation members are $\lambda/2$ retardation films.

22. The liquid crystal display apparatus of claim 20, further comprising a second polarizing member disposed on a lower surface of the fourth retardation member.

23. The liquid crystal display apparatus of claim 20, wherein the first, second, third and fourth retardation members comprise polyarylate.

24. The liquid crystal display apparatus of claim 20, wherein the first, second, third and fourth retardation members comprise polyether sulfone.

* * * * *